United States Patent [19]

Farrissey, Jr. et al.

[11] 4,260,718

[45] Apr. 7, 1981

[54] MODIFIED CARBODIIMIDE-CONTAINING POLYISOCYANATES AND GLASSY POLYURETHANES THEREFROM

[75] Inventors: William J. Farrissey, Jr., Northford; David J. Goldwasser, Cheshire; Kemal B. Onder, New Haven, all of Conn.

[73] Assignee: The Upjohn Company, Kalamazoo, Mich.

[21] Appl. No.: 104,796

[22] Filed: Dec. 18, 1979

[51] Int. Cl.$^3$ .............. C07C 119/055; C07C 127/22; C08G 18/81
[52] U.S. Cl. ................................. 528/60; 260/239 A; 260/453 AR; 260/453 AM; 260/464; 260/465.4; 260/465 D; 528/75
[58] Field of Search ................. 260/239 AL, 453 AR, 260/453 AM, 465 D, 465.4; 528/60, 75

[56] References Cited

U.S. PATENT DOCUMENTS

| | | | |
|---|---|---|---|
| 3,285,949 | 11/1966 | Siebert et al. | 260/465.4 |
| 4,077,989 | 3/1978 | Schafer et al. | 260/404.5 |

*Primary Examiner*—Dolph H. Torrence
*Attorney, Agent, or Firm*—James S. Rose; Denis A. Firth

[57] ABSTRACT

Novel liquid organic polyisocyanate compositions are disclosed which are obtained by reacting a carbodiimide-containing organic polyisocyanate with a carboxylic acid terminated butadiene-acrylonitrile low molecular weight copolymer in the proportions of from about 2 to about 30 parts of the copolymer per 100 parts of the polyisocyanate provided there is from about 0.01 to about 0.5 carboxylic acid equivalent per equivalent of carbodiimide.

The liquid polyisocyanates are particularly useful in providing hard glassy polyurethanes having improved impact strengths.

8 Claims, No Drawings

MODIFIED CARBODIIMIDE-CONTAINING POLYISOCYANATES AND GLASSY POLYURETHANES THEREFROM

BACKGROUND OF THE INVENTION

1. Field of the Invention

This invention relates to organic polyisocyanates and is more particularly concerned with modified organic polyisocyanates obtained from carbodiimide-containing polyisocyanates and to the glassy polyurethanes obtained from said modified polyisocyanates.

2. Description of the Prior Art

Carbodiimide-containing organic polyisocyanates derived from different types of organic polyisocyanates are well known in the art having been prepared by a variety of methods; see for example U.S. Pat. Nos. 3,384,653, 3,761,502, and 4,143,063, and German Patent Application DT No. 25 04 400. Generally speaking, the primary purpose for introducing the carbodiimide linkages into the organic polyisocyanates in the first place is to ensure that they remain in a liquified and fluid state when stored for extended periods of time even at reduced temperatures.

Carbodiimide-containing polyisocyanates, for the most part, tend to be insoluble in organic solvents. U.S. Pat. No. 4,077,989 discloses a method whereby such polyisocyanates are solubilized by converting some or all of the carbodiimide groups into acylated urea groups by reacting the carbodiimide-containing polyisocyanate with certain mono- or polycarboxylic acid compounds.

We have now discovered that carbodiimide-containing polyisocyanates can be modified by the formation of adducts with certain carboxylic acid terminated butadiene-acrylonitrile copolymers to give rise to novel and useful liquid polyisocyanate compositions.

When the isocyanate compositions in accordance with the present invention are used in the preparation of solid glassy polyurethanes, the products so obtained are characterized by improved impact strengths with retention of good high temperature resistance properties.

A comparison of the impact strengths and heatdeflection temperatures of solid glassy polyurethanes prepared with polyisocyanates modified according to the teaching of U.S. Pat. No. 4,077,989, cited supra, with a solid glassy polyurethane prepared with a polyisocyanate in accordance with the present invention shows clearly the superior properties of the latter material (see Example 4 below).

Surprisingly, the impact strength improvement is greater than one would predict from the use of the carboxylic acid terminated butadiene-acrylonitrile copolymer as a reaction component directly in the urethane forming reaction mixture (see the comparison of plaque E with plaque F in Example 1 below); for a summary of the use of butadiene-acrylonitrile polymers in toughening plastics see "Toughening Thermosets with Liquid Butadiene/Acrylonitrile Polymers" by E. H. Rowe et al., Modern Plastics, 1970, 47, 110.

Aside from the novel and useful feature of carrying their own built-in impact improving agent, the isocyanates of the invention enjoy the other advantageous features attributed to the prior art carbodiimide-containing polyisocyanates.

SUMMARY OF THE INVENTION

This invention comprises liquid organic polyisocyanate compositions comprising the product obtained by heating together, at a temperature of from about 40° C. to about 105° C., a mixture comprising:

(a) a carbodiimide-containing organic polyisocyanate; and (b) a carboxylic acid terminated butadiene-acrylonitrile copolymer characterized by a carboxylic acid functionality of from about 1.75 to about 2.5, a viscosity in centipoises at 27° C. of from about 55,000 to about 625,000, and an acrylonitrile content of from about 5 to about 30 percent by weight of said butadiene-acrylonitrile copolymer, and wherein said butadiene-acrylonitrile copolymer is employed in the proportions by weight of from about 2 to about 30 parts per 100 parts of said polyisocyanate provided there is from about 0.01 to about 0.5 carboxylic acid equivalent per equivalent of carbodiimide.

The invention also comprises the glassy polyurethane polymers prepared from the above-described polyisocyanate compositions and at least one organic polyhydric alcohol.

The term "carbodiimide-containing organic polyisocyanate" means an organic polyisocyanate which has been treated to convert from about 3 percent to about 25 percent of the original isocyanate groups into free carbodiimide groups or the corresponding uretidinedioneimine adducts thereof formed from a free isocyanate groups and the carbodiimide linkage.

The term "carboxylic acid equivalent" means the carboxylic acid terminated butadiene-acrylonitrile copolymer equivalent weight which is obtained by dividing the molecular weight of said copolymer by the number of carboxylic acid groups per mole.

The term "equivalent of carbodiimide" means the carbodiimide equivalent weight which is obtained by dividing the molecular weight of said carbodiimide-containing molecule by the number of carbodiimide groups or uretidinedioneimine adducts thereof per mole.

The term "glassy polyurethane polymers" means amorphous hard non-crystalline polyurethanes which may or may not be crosslinked.

Generally speaking, the organic polyisocyanate compositions in accordance with the present invention find utility in all of the applications in which organic polyisocyanates are known to be useful such as the production of polyurethane and polyisocyanurate foams which foams are used to make thermal and acoustic insulation panels and sprays for industrial buildings and the like and in the preparation of microcellular polyurethanes by molding operations including reaction injection molding (RIM).

However, as noted above, it is in the preparation of glassy polyurethane polymers that the present compositions find particular utility and wherein their most advantageous and surprising properties come to light and are utilized in the polymers so formed. The polyisocyanate compositions are particularly useful in the production of hard polyurethane auto component parts and equipment housings prepared by RIM techniques wherein the parts must have high moduli and high impact strength combined with good resistance to high temperature environment.

DETAILED DESCRIPTION OF THE INVENTION

The novel liquid organic polyisocyanate compositions in accordancce with the present invention are prepared by heating together the carbodiimide-containing organic polyisocyanate (a) defined above and the carboxylic acid terminated butadiene-acrylonitrile copolymer (b) also defined above in the proportions set forth hereinbefore.

Preferably, (b) is employed within a range of from about 5 to about 25 parts, most preferably, from about 10 to about 20 parts, per 100 parts of said polyisocyanate with the proviso noted hereinbefore that there be from about 0.01 to about 0.5 carboxylic acid equivalent per equivalent of carbodiimide with a preferred carboxylic acid range of from about 0.1 to about 0.4 equivalent.

The liquid polyisocyanate compositions in accordance with the present invention are characterized by an isocyanate equivalent weight range of from about 100 to about 225 with a preferred range of from about 135 to about 190, and most preferably, from about 140 to about 175.

While not wishing the present invention to be bound by any theoretical considerations but only by the claims appended hereinbelow, it is believed that the terminal carboxylic acid groups of the polybutadiene-acrylonitrile copolymer attach themselves to the carbodiimide via acyl urea linkages to form an adduct (III) according to the following schematic equation; see the teaching of U.S. Pat. No. 4,077,989 for the formation of acyl urea groups in carbodiimide-containing polyisocyanates.

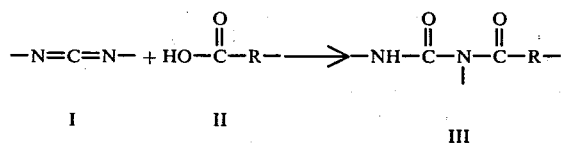

Formula (I) represents a carbodiimide-containing organic polyisocyanate (a) with (II) representing one carboxylic acid terminated end of a butadiene-acrylonitrile copolymer (b) wherein R represents the butadiene-acrylonitrile chain minus the other terminal carboxylic acid group. The formula (III) is a simplified version of that part of the adduct of an organic polyisocyanate in accordance with the present invention showing only the linkage between the carbodiimide part of the polyisocyanate and the copolymer.

Presumably, the other carboxylic acid group which is not shown in (II) attaches itself in similar fashion to another carbodiimide-containing polyisocyanate to form the same linkage shown in (III).

The appropriate reaction temperature to which (a) and (b) are subjected is easily determined by one skilled in the art by trial and error methods to determine optimum conditions, etc. Generally speaking, the temperature will depend on the desired reaction times and particularly the reactivity of the carbodiimide-containing organic polyisocyanate towards dimer formation (aromatic polyisocyanates tend to form dimers much more readily than aliphatic or cycloaliphatic polyisocyanates). Dimer formation, generrlly speaking, is to be avoided because the dimers produced tend to form solid residues in the liquid isocyanates upon standing.

Any convenient analytical method for assaying the carbodiimide or corresponding uretidinedioneimine adduct content of the starting polyisocyanate compared with the final product, or the acyl urea content of the final product can be employed to determine the end point in the reaction. Infrared absorption analysis is particularly suited because of the strong characteristic absorptions at 2120 cm$^{-1}$, 1369 cm$^{-1}$, and 1660 cm$^{-1}$ respectively for the above linkages which can be observed for maximum decrease and increase respectively; see also the analytical procedures taught in U.S. Pat. No. 4,077,989.

Advantageously, the components are heated together at a temperature which avoids the formation of dimers but results in a fairly rapid adduct formation and this temperature falls within a range of from about 40° C. to about 105° C., preferably from about 60° C. to about 100° C.

The length of time for carrying out the reaction is not critical and the end point is easily determined by one skilled in the art using, typically, the infrared analysis method referred to hereinabove.

The method by which the mixture (a) and (b) are made to react is not critical so long as the two components are brought into thorough contact with each other at the appropriate temperature. The reactants can be hand or machine mixed then allowed to stand for a period of time at the reaction temperature. Alternatively, they can be machine mixed and heated simultaneously using any appropriate reaction flask, kettle, reactor, or the like. Mixing during the heating period is not essential but is preferred.

Preferably, (a) and (b) are reacted in an inert atmosphere, such as nitrogen and with the exclusion of moisture.

The carbodiimide-containing organic polyisocyanate (a) can be any organic polyisocyanate in which from about 3 percent to about 25 percent of the original isocyanate groups have been converted to carbodiimide linkages using any method known in the art for effecting this type of conversion.

Generally speaking, said carbodiimide-containing organic polyisocyanate contains from about 0.015 to about 0.20 equivalent of carbodiimide per equivalent of isocyanate.

For the various types of carbodiimide-containing polyisocyanates and typical means for their preparation, the disclosures of U.S. Pat. Nos. 3,384,653, 3,761,502, and 4,143,063 cited supra are incorporated by reference herein.

Thus the carbodiimide-containing polyisocyanates for use in the preparation of the compositions of the present invention can be any of the known carbodiimide-containing aliphatic, aromatic, aralkyl, and cycloaliphatic polyisocyanates containing two or more isocyanate groups.

Illustrative of such organic carbodiimide-containing polyisocyanates are those derived from 2,4-toluene diisocyanate, 2,6-toluene diisocyanate or mixtures thereof, 4,4'-methylenebis(phenyl isocyante), 2,4'-methylenebis(phenyl isocyanate), 2,2'-methylenebis(phenyl isocyante), 4,4'-methylenebis(cyclohexyl isocyanate), 2,4'-methylenebis(cyclohexyl isocyanate), 2,2'-methylenebis(cyclohexyl isocyanate), polymethylene polyphenyl polyisocyanate, α,α'-xylene diisocyanate, β,β'-diethylbenzene diisocyanate, 4,4',4''-triphenylmethylene triisocyanate, o-tolidien diisocyanate, hexamethylene diisocyanate, octamethylene diisocyanate, decamethylene diisocyanate, and the like such as those polyisocyanates listed by Siefkin, Ann. 562, 122–135, 1949. Mixtures of two or more of the above isocyanates can be employed if desired. Also mixtures of the above carbodiimide-containing polyisocyanates with other polyisocyanates which are free of carbodiimide groups can be employed in the preparation of the liquid organic polyisocyanate compositions in accordance with the present invention as long as the above limitations are met.

The preferred group of organic carbodiimide-containing polyisocyanates for use in the present invention are those derived from the aromatic polyisocyanates and a preferred group within the aromatic polyisocyanates are those derived from the methylenebis(phenyl isocyanates) which include 4,4'-, 2,4'-and 2,2'-methylenebis(phenyl isocyanate), and mixtures of these in any combination wherein the isocyanate equivalent weight is from about 130 to about 180 and the carbodiimide content is from about 0.05 to about 0.10 equivalent per equivalent of isocyanate.

The carboxylic acid terminated butadiene-acrylonitrile copolymers are linear copolymers of low molecular weight and are readily prepared using prior art methods (see U.S. Pat. No. 3,285,949 for a typical method for the preparation of carboxyl terminated butadiene-acrylonitrile copolymers).

The low molecular weight copolymers are characterized by a molecular weight ($\bar{M}_n$) range of from about 2000 to about 5000, preferably from about 3000 to about 4000, with a most preferred value of about 3500.

The bulk viscosity of the low molecular weight copolymers can vary while still remaining within the narrow molecular weight ranges set forth above. In fact, depending on the weight percent content of the acrylonitrile in the copolymer, the viscosity can vary within the broad range set forth above while the molecular weight will remain relatively constant. Generally speaking, the viscosity increases with the acrylonitrile content at a fixed molecular weight.

Advantageously, the acrylonitrile content of the copolymers will fall within the weight percent range of the total copolymer weight of from about 5 to about 30, preferably about 10 to about 25, most preferably about 17 percent by weight.

The free terminal carboxylic functionality, generally speaking, falls within a range of from about 1.75 to about 2.5 and preferably from about 1.85 to about 2.0.

A series of copolymers meeting the above requirements is supplied by the B. F. Goodrich Chem. Div., Cleveland, Ohio under the series trademark name of Hycar ® CTBN polymers.

As noted above the polyisocyanate compositions in accordance with the present invention can be used in any of the applications wherein organic polyisocyanates of the prior art find utility.

However, it is in the preparation of glassy polyurethanes wherein the highly unexpected and useful properties of the isocyanate compositions of the present invention principally reside.

Glassy polyurethanes as defined above are simply non-cellular or solid polyurethanes which are hard and amorphous and are prepared from an organic polyisocyanate and at least one polyhydric alcohol, preferably with a functionality greater than two.

For typical methods for the preparation of solid hard polyurethanes see U.S. Pat. No. 4,101,529 whose disclosure and teaching relative thereto is incorporated by reference herein.

Generally speaking, glassy polyurethanes in accordance with the present invention and possessing optimum physical properites are obtained when the polyhydric alcohol component used for reaction with the organic polyisocyanates of the invention is comprised of a low molecular weight polyol (preferably less than about 250), containing from 3 to 5 active hydrogens per molecule, and the extender used in the reaction is a low molecular weight preferably less than about 250) dihydric alcohol.

Illustrative of the low molecular weight polyol are trimethylolpropane, trimethylolethane, 1,2,4-butanetriol, 1,2,6-hexanetriol, glycerine, and the like.

Illustrative of the low molecular weight extender are ethylene glycol, 1,3-propanediol, 1,4-butanediol, diethylene glycol, dipropylene glycol and the like.

The optional use of other additives in the glassy polyurethanes such as catalysts, dispersing agents, flame retardants, anti-oxidants, colorants, reinforcing agents such as inorganic and organic fibers, particles, etc., and the like is within scope of the present invention.

A surprising result, as noted hereinbefore, is the finding that the impact strengths of the glassy polyurethanes prepared form the polyisocyanate compositions of the invention are higher than in the case of the glassy polyurethanes wherein the butadiene-acrylonitrile copolymer was not prereacted with the carbodiimide-containing polyisocyanate but rather added at the time the polyurethane reaction was carried out (compare plaque F with plaque E, Table I, Ex. 1).

The following examples describe the manner and process of making and using the invention and set forth the best mode contemplated by the inventors of carrying out the invention but are not to be construed as limiting.

EXAMPLE 1

A liquid organic polyisocyanate (Isocyanate II) in accordance with the present invention was prepared by heating together the following two ingredients in the proportions by weight set forth below.

One hundred parts of a polyisocyanate in accordance with the prior art (hereinafter referred to as Isocyanate I) which is a modified methylenebis(phenyl isocyanate) obtained by heating methylenebis(phenyl isocyanate) containing about 94 percent by weight 4,4'-isomer and 6 percent 2,4'-isomer with 3 percent by weight of triethylphosphate at 220° C. for 3 hours in accordance with U.S. Pat. No. 3,384,653 having an isocyanate equivalent weight of 144 and wherein about 9.6 percent of the original isocyanate groups were consumed to form carbodiimide, so that one equivalent weight of Isocyanate I contained 0.056 equivalent of carbodiimide, was heated at 100° C. for 3 hours in a stirred resin kettle under nitrogen with 10 parts of a carboxylic acid terminated polybutadiene/acrylonitrile copolymer supplied by B. F. Goodrich (Chem. Div., Cleveland, Ohio) under the tradename of Hycar ® 1300X8 and characterized by a molecular weight of about 35000, a carboxylic acid functionality of 1.85, an acrylonitrile content of about 17 percent by weight, and viscosity (cps at 27° C.)=125,000. The ratio of acid equivalent per carbodiimide equivalent was 0.13 to 1.

A series of glassy polyurethane molded plaques were prepared using the ingredients in the proportions of parts by weight set forth in Table I below. Plaques A through E are in accordance with the prior art while F is in accordance with the present invention.

The same procedure was followed in making all the plaques and consisted of the following steps. The isocyanates (I and II), polyols (Poly G ® 55-56 for B and D), and the mixed extenders (dipropylene glycol and trimethylolpropane for A, B, E, and F, or 1,4-butanediol and trimethylolpropane for C, and D) were degassed individually. The isocyanates for plaques B and D were mixed with 80 percent of the Poly G ® 55-56 and degassed and the balance of the polyol was mixed with the mixed extenders and degassed. The Hycar ® 1300X8 used in Plaque E was mixed with the isocyanate and that mixture degassed. Catalysts were purposely not used because longer gel times result in better quality moldings. The components were mixed together by hand for about 1 minute in a one quart paper cup and poured into a metal mold consisting of a stainless steel frame containing a cavity and resting on an aluminum plate measuring 9 inches by 7 inches by $\frac{1}{8}$ inch. The mold was placed onto the cold platens of a compression molding press and the heaters turned on. After the reactants started to thicken (about 3 to 7 minutes) a pressure of 500 psi was applied and the heat and pressure continued until the mold reached about 160° C. to 175° C. and held thereat for about 25 minutes. The resulting plaque was cooled under pressure and demolded. The plaque was postbaked at 110° C. for one to two hours.

The plaques so obtained were subjected to the testing procedures set forth in Table I.

resistance in a modified Gardner test described in Footnote 3. The heat resistance was determined using a heat deflection temperature (HDT) test and thermal mechanical analysis (TMA) softening point.

Replacement of the dipropylene glycol extender by 1,4-butanediol in the A and B formulation resulted in plaques C and D wherein the impact strength was adversely affected in both plaques with the latter also characterized by poorer heat resistance similarly to B.

When the Hycar ® 1300X8 was added to the formulation in accordance with the prior art the impact strength of the plaque E was increased without the loss of heat resistance which result is in accordance with prior art teaching with respect to the addition of Hycar ® type rubbers to glassy polymers such as polyepoxides and polyesters.

However, when Isocyanate II in accordance with the present invention was substituted for Isocyanate I in the A formulation the resulting plaque F was characterized by a even greater impact strength over any of the other plaques including plaque E and with substantially no loss in heat resistance.

TABLE I

| Plaque | A | B | C | D | E | F |
|---|---|---|---|---|---|---|
| Ingredients (pts. by wt.): | | | | | | |
| Isocyanate I | 100 | 100 | 100 | 100 | 100 | — |
| Isocyanate II | — | — | — | — | — | 110 |
| Dipropylene glycol | 35.13 (0.524 eq.) | 34.6 (0.516 eq.) | — | — | 35.14 (0.524 eq.) | 35.14 |
| Trimethylolpropane | 8.13 (0.182 eq.) | 8.01 (0.179 eq.) | 8.13 (0.182 eq.) | 8.01 (0.179 eq.) | 8.12 (0.182 eq.) | 8.12 |
| Poly G ® 55-56[1] | — | 10 (0.01 eq.) | — | 10 (0.01 eq.) | — | — |
| 1,4-Butanediol | — | — | 23.6 (0.524 eq.) | 23.26 (0.517 eq.) | — | — |
| Hycar ® 1300 × 8 | — | — | — | — | 10 | — |
| Physical properties of molded urethane: | | | | | | |
| Izod impact[2] (ft.-lb./inch of notch) | 1.10 | 1.25 | 0.45 | 0.9 | 2.46 | 3.13 |
| Impact resistance[3] (ft.-lb.) | 0.36 | 0.50 | 0.33 | 0.28 | 1.67 | 2.53 |
| Heat deflection temperature[4] °C. (under 264 psi at 0.01″ deflection) | 111° C. | 95° C. | 110° C. | 92° C. | 112° C. | 109° C. |
| Thermal mechanical analysis[5] softening point (°C.) | | | | | | |
| break | 110° C. | 97° C. | 110° C. | — | — | — |
| peak | 117° C. | 100° C. | — | — | — | — |
| Plaque appearance | clear | clear | clear | clear | opaque | opaque |

Footnotes to Table I
[1] Poly G ® 55-56 is a 2000 MW polypropylene polyethylene ether glycol having primary hydroxyls and with an ethylene oxide content of about 45% by weight; OH eq. wt. = 994.
[2] Izod impact str. in ft.-lb/inch of notch is determined in accordance with ASTM Test Method D-256-56.
[3] Impact resistance: the test is carried out on a Gardner light-duty variable impact tester, model IG-115 (Gardner Laboratory Inc., 5521 Landy Lane, Bethesda, Maryland), according to the following procedure: Fifteen to twenty-five representative samples tested, measuring 2″ long × $\frac{1}{4}$″ wide and $\frac{1}{8}$″ thick are subjected to impact by dropping a 1.39 pound round nose steel rod upon one surface, from varying heights. Sample fracture is registered as a failure. The numerical value in foot-pounds, assigned as the impact resistance of a given sample, represents the mean break or failure height and is calculated by the Bruceton Staircase statistical technique [see Report No. 101.1 R, SRG-P, No. 40 of the Applied Mathematics Panel of the National Defense Research Committee (July 1944); O. R. Weaver, Materials Research and Standards, Vol. 6, No. 6, pps. 285-292 (June 1966)].
[4] Heat deflection temp. (HDT) is determined in accordance with ASTM Test Method D648-56.
[5] Thermal mechanical analysis (TMA) softening point is measured using a DuPont 941 Thermal Analyzer in the TMA mode using 50 gram loading on the penetration probe and a heating rate of 10° C. per minute.

The standard plague A formulation which contained trimethylolpropane and dipropylene glycol as extender provided a typical glassy polyurethane plaque in accordance with the prior art. The addition of a further polyol component having a relatively high molecular weight resulted in plaque B in which only a slight but expected increase in impact strength was observed with a concomitant decrease in heat resistance.

The impact strength was determined by two separate tests, namely, the notched Izod test and the impact

EXAMPLE 2

The Isocyanates II, III, IV, V, VI, and VII in accordance with the present invention along with the other ingredients set forth in parts by weight in Table II were used to prepare the glassy polyurethane plaques H, I, J, K, L, and M also in accordance with the present invention.

The preparation of Isocyanate II was described in Example 1. Isocyanates III, IV, V, VI, and VII were prepared using the same procedure set forth in Example 1 by reacting the 100 parts of Isocyanate I with 5 parts, 15 parts, 20 parts, 25 parts, and 30 parts respectively of Hycar ® 1300X8 so that the respective ratios of acid equivalent per carbodiimide equivalent were 0.067, 0.202, 0.267, 0.336, and 0.404.

Plaques G and N not in accordance with the invention were prepared from Polyisocyanate I and Polyisocyanate VIII both of which are not in accordance with this invention. Polyisocyanate VIII was prepared from 100 parts of Polyisocyanate I and 40 parts of Hycar ® 1300X8 which amount is outside the scope of the present invention.

Plaque G was characterized by an inferior impact strength in comparison to any one of plaques H through M. Plaque N, while having an excellent impact strength its heat resistance (HDT value of only 65° C. compared to the 111° C. for plaque G) was poor. Additionlly, the flexural strength and modulus dropped to poor levels.

Plaques H through M were all characterized by superior impact strength to plaque G while at the same time retaining their heat resistance and good flexural properties.

The reaction between the carboxylic acid terminated copolymer and the carbodiimide-containing polyisocyanate was monitored by measuring residual carbodiimide content in the plaques G through M by measurement of the carbodiimide absorption band at 2120 cm$^{-1}$. Residual carbodiimide fell steadily as the amount of copolymer was increased. Agreement between measured and calculated conversions (assuming all acid groups react with carbodiimide) was surprisingly good.

| Plaque | Isocyanate | Hycar ®/ Iso. (pts.) | % Carbodiimide Unreacted I.R. | Theor. |
| --- | --- | --- | --- | --- |
| G | I | 0/100 | — | — |
| H | III | 5/100 | — | 93.2 |
| I | II | 10/100 | 92.6 | 86.6 |
| J | IV | 15/100 | 85.2 | 79.2 |
| K | V | 20/100 | 72.1 | 73.2 |
| L | VI | 25/100 | 64.2 | 66.4 |
| M | VII | 30/100 | 62.5 | 59.6 |

EXAMPLE 3

The following experiments set forth a comparison of three glassy polyurethane plaques O, J (Example 2), and P prepared from Isocyanates IX, IV, and X in accordance with the present invention with plaque G (Example 2) not of the invention.

Isocyanate IX was prepared from 100 parts of Isocyanate I and 15 parts of Hycar ® 1300X15 (supplied by B. F. Goodrich, Cleveland, Ohio) which is a carboxylic acid terminated copolymer of polybutadiene/acrylonitrile having an acrylonitrile content of about 10 percent by weight, molecular wt.=3500, carboxylic acid functionality of 1.9, and viscosity (in cps. at 27° C.)=55,000, using the procedure set forth in Example 1. The ratio of acid equivalent per carbodiimide equivalent was 0.207 to 1.

Similarly, Isocyanate X was prepared from 100 parts of Isocyanate I and 15 parts of Hycar ®1300X13 (supplied by B. F. Goodrich noted supra) which is a carboxylic acid terminated copolymer of polybutadiene/acrylonitrile having an acrylonitrile content of about 27 percent by weight, molecular wt.=3500, carboxylic acid functionality of 1.85, and viscosity (in cps. at 27° C.)=625,000. The ratio of acid equivalent per carbodiimide equivalent was 0.202 to 1.

The preparation of Isocyanate IV is set forth above in Example 2 along with the preparation of plaques J and G.

Plaques O, J, and P all have superior impact properites compared to plaque G, whether tested by the Izod method or the modified Gardner type, and, at the same time, they maintained good heat resistant properties. Flexural properties of O, J, and P, were also maintained in spite of the additional Hycar ® polymeric components.

TABLE III

| Plaque | G | O | J | P |
| --- | --- | --- | --- | --- |
| Ingredients (pts. by wt.): | | | | |
| Isocyanate I | 100 | — | — | — |
| Isocyanate IX | — | 115 | — | — |
| Isocyanate IV | — | — | 115 | — |
| Isocyanate X | — | — | — | 115 |
| Dipropylene glycol | 35.13 | 35.13 | 35.13 | 35.13 |
| Trimethylolpropane | 8.13 | 8.13 | 8.13 | 8.13 |
| Izod impact | 1.10 | 2.78 | 4.67 | 1.96 |

TABLE II

| Plaque | G | H | I | J | K | L | M | N |
| --- | --- | --- | --- | --- | --- | --- | --- | --- |
| Ingredients (in pts. by wt.): | | | | | | | | |
| Isocyanate I | 100 | — | — | — | — | — | — | — |
| Isocyanate III | — | 105 | — | — | — | — | — | — |
| Isocyanate II | — | — | 110 | — | — | — | — | — |
| Isocyanate IV | — | — | — | 115 | — | — | — | — |
| Isocyanate V | — | — | — | — | 120 | — | — | — |
| Isocyanate VI | — | — | — | — | — | 125 | — | — |
| Isocyanate VII | — | — | — | — | — | — | 130 | — |
| Isocyanate VIII | — | — | — | — | — | — | — | 140 |
| Dipropylene glycol | 35.13 | 35.13 | 35.13 | 35.13 | 35.13 | 35.13 | 35.13 | 35.13 |
| Trimethylolpropane | 8.13 | 8.13 | 8.13 | 8.13 | 8.13 | 8.13 | 8.13 | 8.13 |
| Izod impact (ft.lbs./inch notch) | 1.10 | 1.79 | 3.13 | 4.67 | 4.50 | 4.30 | 4.73 | 5.31 |
| Impact resistance (ft.-lb.) | 0.36 | 2.12 | 2.83 | 3.06 | 2.9 | 3.2 | 3.6 | 4.6 |
| HDT, °C. (264 psi, 0.01 " defl.) | 111° | 107° | 109° | 111° | 112° | 109° | 100° | 65° |
| TMA, softening point, °C. | | | | | | | | |
| break | 111° | 124° | 105° | 100° | 100° | 100° | 90° | 100° |
| peak | 117° | 126° | 109° | 110° | 109° | 107° | 104° | 106° |
| Flexural str. (Ksi) | 21.4 | 19.7 | 17.3 | 14.1 | 13.6 | 12.0 | 8.0 | 2.74 |
| Flexural mod. (Ksi) | 437 | 390 | 358 | 287 | 289 | 240 | 134 | 44.9 |

TABLE III-continued

| Plaque | G | O | J | P |
|---|---|---|---|---|
| (ft.lbs./inch notch) | | | | |
| Impact resistance | 0.36 | 1.46 | 3.06 | 1.29 |
| (ft.-lb.) | | | | |
| HDT, °C. | 111° | 108° | 111° | 98° |
| (264 psi, 0.01" def.) | | | | |
| TMA, softening pt. °C. | | | | |
| break | 111° | 98° | 100° | 95° |
| peak | 117° | 109° | 109° | 101° |
| Flexural str. (Ksi) | 21.4 | 15.3 | 13.6 | 17.3 |
| Flexural mod. (Ksi) | 437 | 351 | 289 | 384 |

EXAMPLE 4

The following example sets forth the preparation of two modified Isocyanates XI and XII not in accordance with the present invention but prepared in accordance with the teachings of U.S. Pat. No. 4,077,989. Isocyanate XI was prepared by reacting in the following proportions 6.64 g. (0.0235 acid equivalent weight) of oleic acid with 100 g. of Isocyanate I identified in Example 1 and using the procedure described therein for reacting the Hycar ® 1300X8 with Isocyanate I. Similarly, Isocyanate XII was prepared by reacting in the following proportions 2.36 g. (0.0084 eq.) of oleic acid with 100 g. of Isocyanate I. The Isocyanates XI and XII contained the oleic acid at acid equivalent levels of 0.577 and 0.205 respectively based on one equivalent of carbodiimide.

Comparatively, the Isocyanate IV in accordance with the present invention and described in Example 2 above contained the Hycar ® 1300X8 and Isocyanate I in the proportions of 15 g. (0.0083 acid equivalents) per 100 g. of Isocyanate I or 0.204 acid equivalent per equivalent of carbodiimide.

Plaques Q and R not in accordance with the present invention were prepared using the Isocyanates XI and XII respectively and the other ingredients in the proportions by weight set forth in Table IV. Also shown are the HDT and Izod impact test results for the two plaques.

Plaque J with its formulation based on Isocyanate IV and the test results for the plaque are also shown in Table IV for comparison. The plaque J is characterized by a superior Izod impact strength and better heat deflection temperature than either plaque Q or R.

TABLE IV

| Plaque | J | Q | R |
|---|---|---|---|
| Ingredients (pts. by wt.): | | | |
| Isocyanate IV | 115 | — | — |
| Isocyanate XI | — | 106.64 | — |
| Isocyanate XII | — | — | 102.36 |
| Dipropylene glycol | 35.13 | 35.13 | 35.13 |
| | (0.524 eq.) | (0.524 eq.) | (0.524 eq.) |
| Trimethylolpropane | 8.13 | 8.13 | 8.13 |
| | (0.174 eq.) | (0.174 eg.) | (0.174 eq.) |
| HDT, °C. | 111° | 88° | 101° |
| (264 psi, 0.01" def.) | | | |
| Izod impact | 4.67 | 0.78 | 1.04 |
| (ft.-lbs./inch notch) | | | |
| Plaque appearance | Opaque | Clear | Clear |

We claim:

1. A liquid organic polyisocyanate composition comprising the product obtained by heating together at a temperature of from about 40° C. to about 105° C. a mixture comprising:
   (a) a carbodiimide-containing organic polyisocyanate; and
   (b) a carboxylic acid terminated butadiene-acrylonitrile copolymer characterized by a carboxylic acid functionality of from about 1.75 to about 2.5, a viscosity in centipoises at 27° C. of from about 55,000 to about 625,000, and an acrylonitrile content of from about 5 to about 30 percent by weight of said butadiene-acrylonitrile copolymer, and wherein said butadiene-acrylonitrile coplymer is employed in the proportions by weight of from about 2 to about 30 parts per 100 parts of said polyisocyanate provided there is from about 0.01 to about 0.5 carboxylic acid equivalent per equivalent of carbodiimide.

2. A composition according to claim 1 wherein said (a) is a carbodiimide-containing aromatic polyisocyanate.

3. A composition according to claim 2 wherein said (a) is a carbodiimide-containing methylenebis(phenyl isocyanate) having an isocyanate equivalent weight of from about 130 to about 180.

4. A composition according to claim 1 wherein said (b) is employed in the proportion of from about 5 to about 25 parts per 100 parts of polyisocyanate.

5. A composition according to claim 1 wherein said butadiene-acrylonitrile has an acrylonitrile content of about 17 percent by weight, a terminal carboxylic acid functionality of about 1.85, and a viscosity in centipoises at 27° C. of about 125,000.

6. A liquid organic polyisocyanate composition comprising the product obtained by heating together at a temperature of from about 40° C. to about 105° C. a mixture comprising:
   (a) a carbodiimide-containing methylenebis(phenyl isocyanate) having an isocyanate equivalent weight of from about 130 to about 180; and
   (b) from about 5 to about 25 parts per 100 parts of (a) of a butadiene-acrylonitrile copolymer characterized by a terminal carboxylic acid functionality of about 1.85, an acrylonitrile content of about 17 percent by weight, and a viscosity in centipoises at 27° C. of about 125,000 and further provided that there is from about 0.01 to about 0.5 carboxylic acid equivalent per equivalent of carbodiimide.

7. A composition according to claim 6 wherein said (b) is employed in the proportions by weight of from about 10 to about 20 parts per 100 parts of said (a) which latter has an isocyanate equivalent weight of about 142 to about 147, and said (a) and said (b) are heated together at a temperature of about 100° C.

8. A glassy polyurethane polymer prepared by the reaction of a polyisocyanate composition in accordance with claim 1 and at least one organic polyhydric alcohol.

* * * * *

UNITED STATES PATENT OFFICE
CERTIFICATE OF CORRECTION

Patent No. 4,260,718      Dated April 7, 1981

Inventor(s) William J. Farrissey, Jr., David J. Goldwasser and Kemal B. Onder

It is certified that error appears in the above-identified patent and that said Letters Patent are hereby corrected as shown below:

Column 6, line 53 "35000" should read --3500--.

Signed and Sealed this

Twenty-eighth Day of July 1981

[SEAL]

Attest:

GERALD J. MOSSINGHOFF

Attesting Officer     Commissioner of Patents and Trademarks